United States Patent
Carosi et al.

(10) Patent No.: US 7,134,675 B2
(45) Date of Patent: Nov. 14, 2006

(54) WHEELBARROW

(76) Inventors: Claudio D. Carosi, 15 Manswood Crescent, Brampton, Ontario (CA) L6T 3Y7; Antonio F Carosi, 15 Manswood Crescent, Brampton, Ontario (CA) L6T 3Y7

(*) Notice: Subject to any disclaimer, the term of this patent is extended or adjusted under 35 U.S.C. 154(b) by 88 days.

(21) Appl. No.: 10/717,530

(22) Filed: Nov. 21, 2003

(65) Prior Publication Data

US 2005/0029761 A1  Feb. 10, 2005

Related U.S. Application Data

(60) Provisional application No. 60/493,330, filed on Aug. 8, 2003.

(51) Int. Cl.
  *B62B 1/18* (2006.01)
(52) U.S. Cl. .................................. 280/47.31
(58) Field of Classification Search ............. 280/47.17, 280/47.24, 47.26, 47.3, 47.31, 47.33, 63, 280/79.2
  See application file for complete search history.

(56) References Cited

U.S. PATENT DOCUMENTS

| | | | | |
|---|---|---|---|---|
| 1,617,644 A | * | 2/1927 | Littlefield | 280/43.1 |
| 2,261,520 A | * | 11/1941 | Knudtson | 280/47.23 |
| 2,532,966 A | * | 12/1950 | Thomas | 280/47.33 |
| 2,589,325 A | * | 3/1952 | Bachman | 280/47.18 |
| 2,817,538 A | * | 12/1957 | Romang | 280/47.26 |
| 4,261,596 A | * | 4/1981 | Douglas | 280/652 |
| 4,921,305 A | * | 5/1990 | Steer | 298/3 |
| 6,050,576 A | * | 4/2000 | Tanner et al. | 280/47.21 |

FOREIGN PATENT DOCUMENTS

| | | | |
|---|---|---|---|
| GB | 2289024 | * | 11/1995 |
| JP | 10-1056 | * | 1/1998 |
| WO | 2005014366 A1 | * | 2/2005 |

* cited by examiner

*Primary Examiner*—Frank Vanaman

(57) ABSTRACT

A wheelbarrow comprises a wheeled body in the shape of a sloping shovel having two opposite side walls, a front loading end and a rear receptacle end; a pair of laterally spaced and readwardly extending handles; and a fulcrum mechanism pivotably connected to the wheelbarrow and moveable from a retracted position where the fulcrum mechanism is clearing the ground and an operative position where the fulcrum mechanism is in engagement with the ground and acting as a fulcrum while force is being applied to the handles to swing the front loading end of the body to shovel up a load, with the fulcrum mechanism assisting in the shovelling action by levering the sloping shovel end forwardly into a load of material.

15 Claims, 2 Drawing Sheets

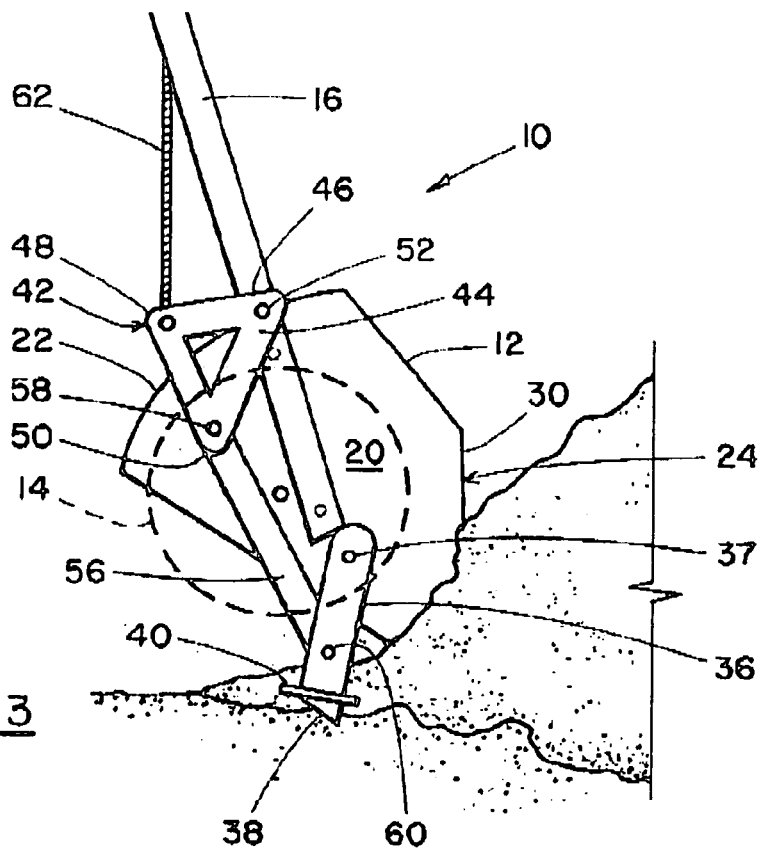
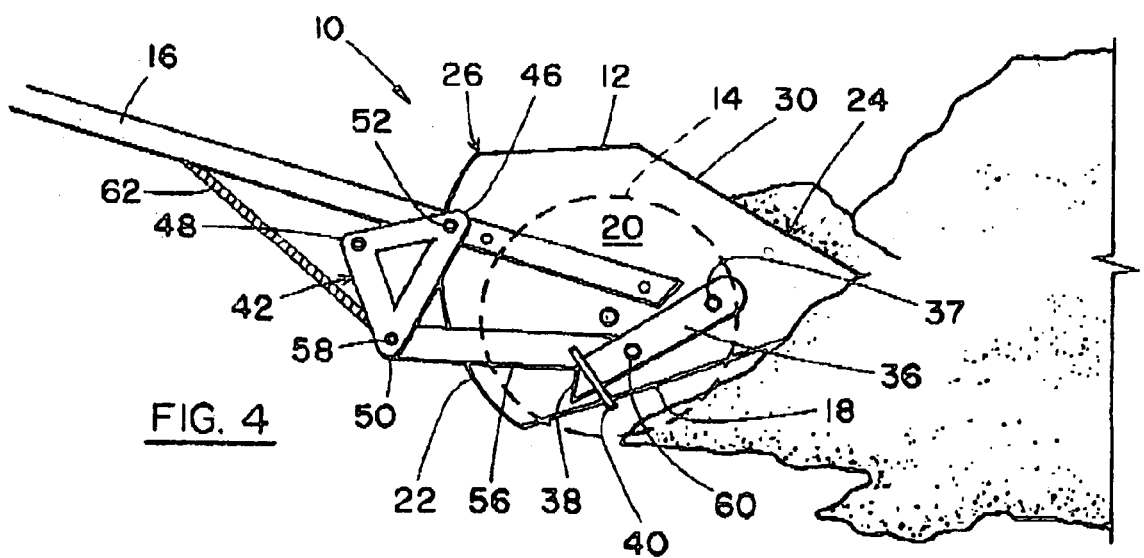

WHEELBARROW

CLAIM OF PRIORITY

This application claims priority from the provisional application No. 60/493330 entitled "wheelbarrow"; Claudio Carosi, inventor; filed 8 Aug. 2003.

FIELD OF THE INVENTION

The present invention relates generally to wheelbarrows.

In particular, the present invention relates to a self-loading wheelbarrow designed to be operable by one operator.

BACKGROUND OF THE INVENTION

A traditional wheelbarrow comprises a tray, two wheels and two handles extending rearwardly. It requires two operators to operate this kind of traditional wheelbarrow. A first operator wheels an empty wheelbarrow to a loading area and holds the wheelbarrow by the handles in a steady position while a second operator fills the tray of the wheelbarrow with materials such as stones, sand, soil, or the like, by using a shovel. After the tray is fully loaded, the first operator wheels the loaded wheelbarrow to a dumping area to dump the load. This kind of wheelbarrow loading operation, requiring two operators, is labour consuming and ineffective.

SUMMARY OF THE INVENTION

According to one aspect of the present invention, there is provided a self-loading wheelbarrow configured to be operable by one operator comprising a body having opposite sidewalls, a wheel system attached to said body for wheeling the wheelbarrow; a front loading sloping end extending forwardly of the wheel system; a rear receptacle end; a pair of laterally spaced handles attached to the body, and a fulcrum mechanism pivotably connected to said wheelbarrow and moveable between a retracted position where the fulcrum mechanism is clearing the ground to permit wheeling of the wheelbarrow, and an operative position where the fulcrum mechanism is in engagement with the ground below the wheel system and acts as a fulcrum while force is being applied to the handles to swing the front loading sloping shovel end of the body to shovel up a load from a pile of material.

According to another aspect of the present invention, there is provided a self-loading wheelbarrow wherein the fulcrum mechanism comprises a fulcrum member pivotably connected to the body between the front loading sloping shovel end thereof, and the rear end, a free end of said fulcrum member being configured to engage to the ground at a level below the wheel system; a first link member pivotably connected to each side wall of the body adjacent the rear receptacle end thereof; a second link member pivotably connecting between the fulcrum member and the first link member; and a cross bar transversely extending behind the body and underneath the handles, each end of the cross bar being secured to the first link member at each opposite side of the body; whereby pushing the cross bar towards the front loading end drives the fulcrum mechanism from the retracted position to the operative position.

According to yet another aspect of the present invention, there is provided a self-loading wheelbarrow wherein a spring is operatively connected to said first link member. The springs provide the spring bias for the fulcrum mechanism. The springs also assist the operator in forcing the sloping shovel end forwardly into the pile of material for loading the material into the body.

According to a further aspect of the present invention, there is provided a self-loading wheelbarrow wherein each of the first link members comprises a first portion pivotably connected to the second link member, a second portion pivotably connected to the body, and a third portion secured to the cross bar.

According to a further aspect of the present invention, there is provided a self-loading wheelbarrow wherein the fulcrum members are two legs, and a stop plate is provided on each fulcrum member at the free end thereof for limiting the penetration of the free end of each fulcrum member into the ground. The stop plate is substantially perpendicular to a longitudinal axis of the fulcrum member. The free end of each fulcrum member is tapered.

According to yet another aspect of the present invention, there is provided a self-loading wheelbarrow wherein the front loading sloping shovel end of the body comprises a blade portion and wherein each opposite sidewall at the front loading end of the body has a height tapering towards the blade portion.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWINGS

FIG. 3 is an illustrative diagram showing the wheelbarrow in a second, loading position, with the legs swung forward and extended and with the wheels raised above ground level; and FIG. 4 is an illustrative diagram showing the wheelbarrow after being loaded, with the legs once more retracted and the wheels on the ground.

DETAILED DESCRIPTION OF THE INVENTION

Figure 1:
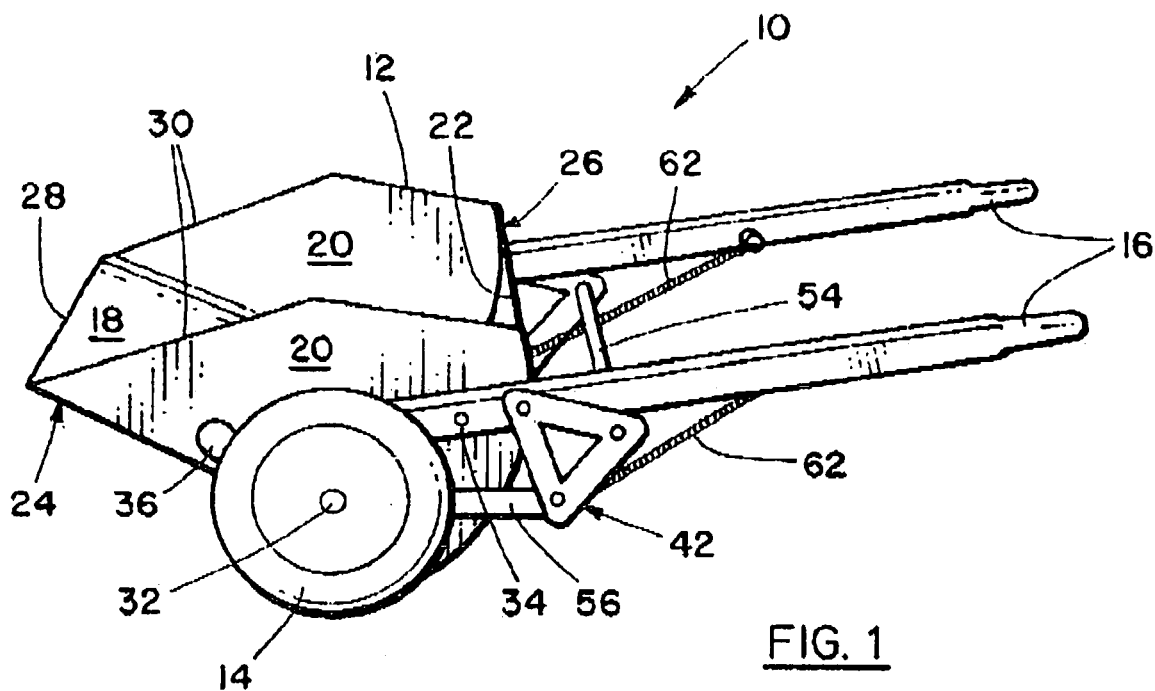
FIG. 1 is a perspective view of a self-loading wheelbarrow in accordance with a preferred embodiment of the present invention.

FIG. 1 is a perspective view of a self-loading wheelbarrow 10 illustrating a preferred embodiment of the present invention. Wheelbarrow 10 comprises a body 12, a wheel system in this case being two wheels 14 rotatably mounted to the body 12, and two laterally spaced handles 16.

The body 12 is generally in the shape of a sloping shovel having a base 18, and two sidewalls 20 and 22. The body 12 has a front loading sloping shovel end 24 and a rear receptacle end 26. The front loading sloping shovel end 24 extends forwardly of the wheel system and enables load materials such as stones, sand, soil, or the like, to be loaded directly without shovelling. The rear receptacle end 26 is the end of the body 12 which prevents the loaded materials from sliding off the base 18.

The front loading end 24 has a sloping shovel blade portion 28 extending across substantially the width of the body 12. The front loading sloping shovel end of the body 12 has tapered sidewalls 30 tapering towards the blade portion 28.

The two wheels 14 are rotatably mounted on opposite sidewalls 20 of the body 12 respectively. Each of the two wheels 14 is rotatably mounted, such as, on an axle 32. The axle is located rearwardly of the sloping shovel end of the body so as to permit material to be shovelled up from a pile directly into the body as described below. This feature also ensures that the weight of the load will be carried principally on the wheels, with only a little weight on the hands and arms of the operator.

The two laterally spaced handles 16 extend rearwardly and are fixedly attached to the body 12 respectively. In the preferred embodiment, the handles 16 are fixedly attached to the opposite sidewalls 20 of the body 12 respectively. Each handle 16 is fastened to each sidewall 20 of the body 12 by fastening means 34 such as bolts and nuts.

A movable fulcrum leg member 36 is pivotably connected to each opposite sidewall 20 of the body 12 at the front loading end thereof by means of pivot pins 37. The free end of each fulcrum leg member 36 is provided with a tapered end 38. This tapered end 38 is configured to anchor into sand or soil on the ground. A stop plate 40 is provided at the free end of the fulcrum leg member 36 above the tapered end 38 in order to limit the penetration of the fulcrum leg member 36 into the ground.

Two first link members 42 is pivotably connected to each opposite sidewall 20 of the body at the rear receptacle end thereof. In accordance with a preferred embodiment of the present invention, the first link member 42 takes the form of a triangular plate 44. Each triangular plate 44 has a first corner 46, a second corner 48, and a third corner 50. The first corner 46 of each triangular plate 44 is pivotably connected to the body 12 by means of a pivot pin 52. A cross bar 54 transversely extends behind the body 12 with both ends each being secured to the second corner 48 of the respective triangular plates 44. The third corner 50 of the respective triangular plate 44 is pivotably connected to one end of a respective second link member 56 by means of a pivot pin 58. The other end of the second link member 56 is pivotably connected towards the free end of a respective fulcrum leg member 36 by means of a pivot pin 60.

The fulcrum leg members 36, the first and second link members 42, 56, and the cross bar 54 together form a fulcrum mechanism.

A spring 62 extends from the first link member 42 to the handle 16 on each side of the body 12. The springs 62 are employed to bias the fulcrum mechanism to a retracted position where the fulcrum members 36 are out of contact from the ground, (FIGS. 2 and 4).

The body 12 and the fulcrum mechanism 36, 42, 56 are preferably made of metal, such as steel, or any other suitable materials.

Figure 2:
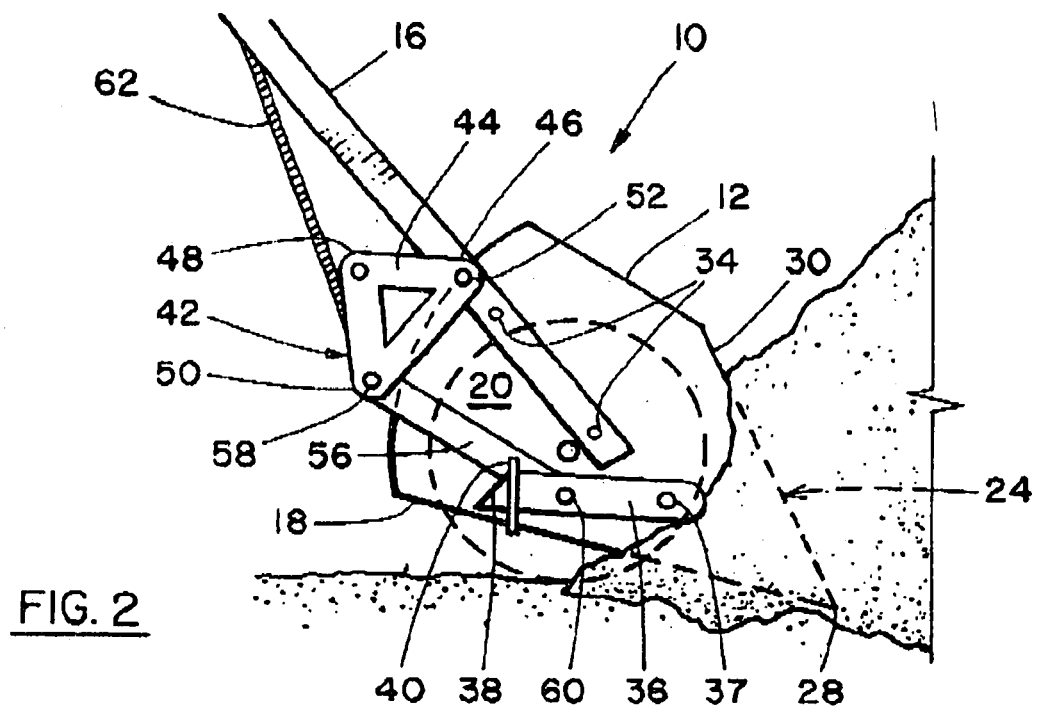
FIG. 2 is an illustrative diagram showing a preferred embodiment of the wheelbarrow in accordance with the present invention in a first position ready for loading, with the wheels still on the ground, and the legs retracted.

FIGS. 2, 3 and 4 show the operation of the self-loading wheelbarrow 10 of the present invention.

An operator holds the handles 16 by his hands and wheels the wheelbarrow 10 between a loading area and a dumping area. In this condition, as shown in FIG. 1, the wheels 14 engage the ground while the body 12 and the fulcrum leg members 36 are retracted and are not engaging the ground.

In order to shovel up a load from the loading area, an operator first wheels the wheelbarrow 10 towards a pile of material in the loading area. The operator then tilts the wheelbarrow 10 forwardly (FIG. 2) by lifting up the two handles 16 so that the handles 16 are at an approximately 11 o'clock position and the wheels 14 are lifted off the ground, as shown in FIG. 2. In this position, the blade portion 28 of the front loading sloping shovel end 24 of the body 12 is angled downwardly, and the sloping shovel end 24 can begin to sink into the pile of material to be loaded. The operator then swings the handles further upward to approximately an 11 o'clock position (FIG. 3). With his foot he then pushes the cross bar 54 generally downwards towards the front loading end 24. This pushes the two fulcrum leg members 36 forwards and downwards into the ground. The fulcrum leg members 36 advance forwards and downwards until the tapered ends 38 sink completely into the ground and further sinking is restricted by the stop plates 40. The fulcrum leg members 36 are now in a ground-engaging position (FIG. 3).

With the foot still pressing on the cross bar 54 and the fulcrum leg members 36 still engaging the ground and acting as fulcrums, the operator starts pulling the handles 16 backwards and downwards. This swings the body 12 downwards and at the same time levers it forwards so that the front loading end 24 advances further, deep into the pile of material, as shown in FIG. 3. With the fulcrum members 36 still engaging the ground and acting as fulcrums, the operator continues to exert downward force to the handles 16. This causes the sloping shovel to adavance further forwardly into the material due to leverage from the fulcrum leg members. In order to start levering and shovelling up the load the operator then swings the handles back down towards himself. This forces the sloping shovel end of the body to shovel up a load of material. This shovelling action is assisted by the action of the fulcrums leg members 36. Because they are firmly anchored in the ground, the rearward swinging of the handles will tend to force the sloping shovel end forwardly into the material. This action is assisted by the springs which tend to want to swing the fulcrum leg members, rearwardly. However since the free ends of the fulcrum leg members are anchored in the ground, the levering effect forces the sloping shovel further into the material, and assists in loading the material. Consequently the springs tend to force the body forwardly and thus assist in shovelling up a larger load of material.

When the handles 16 are lowered to a position where the wheels 14 start to touch the ground, the operator begins to lift his foot off the cross bar 54. When the foot is lifted off the cross bar 54, the fulcrum mechanism 36, 42, 56 swings back to its retracted position under the influence of the biassing springs until the cross bar 54 hits the handles 16.

When the handles 16 are further lowered to an approximately horizontal position, as shown in FIG. 4, the load slides backwards from the front loading end 24 to the rear receptacle end 26 of the body 12 by means of gravity.

This sliding of the load from the front loading end 24 to the rear receptacle end 26 of the body 12 can be facilitated by shaking the body 12.

The above loading steps are repeated to obtain a full load in the body 12. Depending on the kind of material to be loaded, the wheelbarrow may be fully loaded after one shovelling operation.

Although it has been described that the fulcrum mechanism is spring-biassed to the retracted position by means of springs, it is appreciated that the fulcrum mechanism can be retained in the retracted position by other devices such as friction clips or counterweights.

With the fulcrum mechanism retained or biassed in the retracted position, the wheelbarrow of the present invention can be used as a conventional wheelbarrow or a wheeled shovelling device. Wheeling of the loaded wheelbarrow requires much less effort than the conventional wheelbarrow, bacchius the weight of the load is carried over the wheels. The weight is not carried on the arms of the operator, to any significant extent.

The present invention utilizes certain principles and/or concepts as are set forth in the claims appended to this specification. Those skilled in the arts will realize that these principles and/or concepts are capable of being utilized in a variety of embodiments which may differ from the present embodiment utilized for illustrative purposes herein. For this reason, the present invention is not to be construed as being limited solely to the illustrative embodiment, but should only be construed in view of the claims.

What is claimed is:

1. A wheelbarrow comprising:
   a wheeled body, said body being generally in the shape of a sloping shovel having two opposite side walls, a front loading end and a rear receptacle end;
   a pair of laterally spaced handles fixedly attached to said body; and
   a fulcrum mechanism pivotally connected to said wheelbarrow and having two fulcrum leg members each being pivotally connected to a respective side of said body at the front loading end thereof, a free end of each said fulcrum leg member being configured to engage the ground;
   two first link members, each of said first link members being pivotally connected to a respective side of said body at the rear receptacle end thereof, and connecting with said fulcrum leg members; said fulcrum leg members being maveable from a retracted position where said fulcrum leg members are clearing the ground, and an operative position where said fulcrum leg members are in engagement with the ground and acting as a fulcrum, whereby when force is applied to the handles to swing said front loading end of said body to shovel up a load, the fulcrum leg members cooperate to assist in levering up a load of material.

2. A wheelbarrow as claimed in claim 1, wherein said fulcrum mechanism comprises:
   second link members pivotally connecting between said fulcrum leg members and said first link members; and
   a cross bar transversely extending behind said body and underneath said handles, each end of said cross bar being secured to said first link members at each opposite side of said body;
   whereby pushing said cross bar towards the front loading end drives said fulcrum mechanism from said retracted position to said operative position.

3. A wheelbarrow as claimed in claim 2, wherein a spring is operatively arranged between each handle and each first link member, said springs providing the spring bias for said fulcrum mechanism.

4. A wheelbarrow as claimed in claim 2, wherein each of said first link members comprises a first portion pivotally connected to said second link members, a second portion pivotally connected to said body, and a third portion secured to said cross bar.

5. A wheelbarrow as claimed in claim 2, wherein a stop plate is provided on each fulcrum leg member at the free end thereof for limiting the penetration of the free end of each fulcrum leg member into the ground, said stop plate being substantially perpendicular to a longitudinal axis of said fulcrum leg member.

6. A wheelbarrow as claimed in claim 2, wherein the free end of each fulcrum leg member is tapered.

7. A wheelbarrow as claimed in claim 2, wherein the front loading end of said body comprises a blade portion.

8. A wheelbarrow as claimed in claim 7, wherein each opposite sidewall at the front loading end of said body has a height tapering towards said blade portion.

9. A wheelbarrow as claimed in claim 2, wherein said first link members are triangular in shape.

10. A wheelbarrow as claimed in claim 1, wherein said wheelbarrow comprises two wheels each being rotatably mounted on an axle on each side wall of said body, said wheels being mounted intermediate said front loading end and said rear end of said body.

11. A self-loading wheelbarrow configured to be operable by one operator comprising:
    a wheeled body, said body being generally in the shape of a sloping shovel having two opposite side walls, a front loading end and a rear receptacle end;
    a pair of laterally spaced handles fixedly attached to said body; and
    a fulcrum mechanism pivotally connected to said wheelbarrow and moveable from a retracted position where said fulcrum mechanism is clearing the ground and an operative position where said fulcrum mechanism is in engagement with the ground and acting as a fulcrum while force is being applied to the handles to swing said front loading end of said body to shovel up a load; wherein said fulcrum mechanism comprises:
    a fulcrum leg member pivotally connected to each side wall of said body at the front loading end thereof a free end of said fulcrum leg member being configured to engage to the ground;
    a first link member pivotally connected to each side wall of said body at the rear receptacle end thereof;
    a second link member pivotally connecting between said fulcrum leg member and said first link member; and
    a cross bar transversely extending behind said body and underneath said handles, each end of said cross bar being secured to said first link member at each opposite side of said body;
    whereby pushing said cross bar towards the front loading end by a foot of the operator drives said fulcrum mechanism from said retracted position to said operative position.

12. A self-loading wheelbarrow as claimed in claim 11, wherein a spring is operatively arranged between each handle and each pivotally connecting first link member, said springs providing the spring bias for said fulcrum mechanism.

13. A self loading wheelbarrow as claimed in claim 12 wherein said springs urge said fulcrum leg members into a rearward position, and thus assist in forcing the sloping shovel body forwardly into a load.

14. A self-loading wheelbarrow as claimed in claim 11, wherein each of said first link members comprises a first portion pivotally connected to said second link member, a second portion pivotally connected to said body, and a third portion secured to said cross bar.

15. A self-loading wheelbarrow as claimed in claim 11, wherein a stop plate is provided on each fulcrum leg member at the free end thereof for limiting the penetration of the free end of each fulcrum leg member into the ground, said stop plate being substantially perpendicular to a longitudinal axis of said fulcrum leg member.

* * * * *